Nov. 27, 1923.

C. B. SNIDER 1,475,517

TIRE REMOVING TOOL

Filed Nov. 14, 1922

Inventor
C. B. Snider

By D. L. Bryant
Attorney.

Patented Nov. 27, 1923.

1,475,517

UNITED STATES PATENT OFFICE.

CLINT B. SNIDER, OF INDEPENDENCE, KANSAS.

TIRE-REMOVING TOOL.

Application filed November 14, 1922. Serial No. 600,919.

*To all whom it may concern:*

Be it known that I, CLINT B. SNIDER, a citizen of the United States of America, residing at Independence, in the county of Montgomery and State of Kansas, have invented certain new and useful Improvements in Tire-Removing Tools, of which the following is a specification.

This invention relates to certain new and useful improvements in tire removing tools and is particularly designed for removing a pneumatic tire from a wheel rim.

The primary object of the invention is to provide a device for removing pneumatic tires from wheel rims wherein the device in a clamped position upon the rim and tire has power applied thereto for shifting the tire to a position to be removed from one side of the rim and overcoming many difficulties encountered when the tire is rusted or otherwise improperly secured to the rim.

With the above and other objects in view as the nature of the invention is better understood, the same consists of the novel form, combination and arrangement of parts hereinafter more fully described, shown in the accompanying drawing and claimed.

Figure 1:
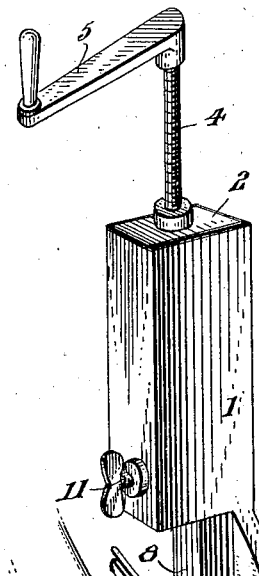

In the drawing, wherein like reference characters designate corresponding parts throughout the several views, Figure 1 is a perspective view of a tire removing tool constructed in accordance with the present invention, a portion of a tire and rim being illustrated with the tool operatively engaged therewith.

Figure 2:
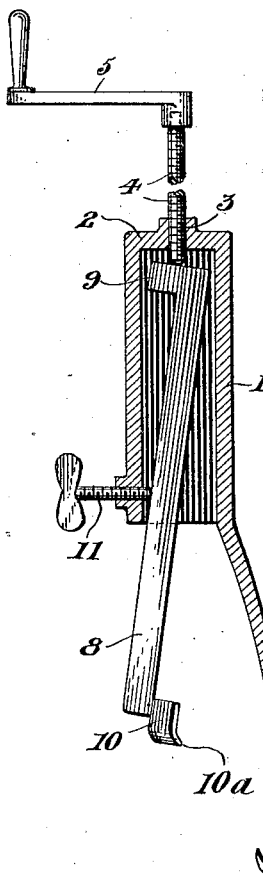
Figure 3:
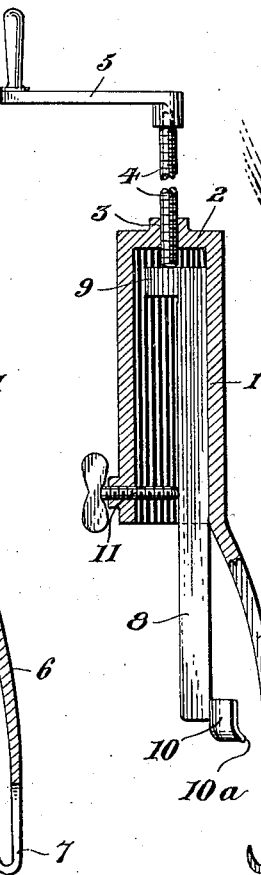
Figure 4:
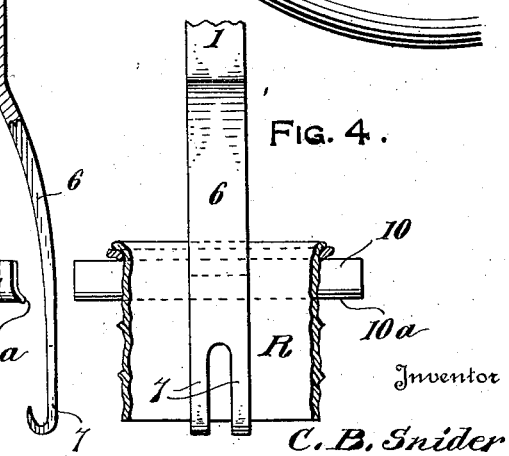

Figure 2 is a vertical sectional view of the tool showing the tire engaging rod loosely mounted in the casing of the tool, Figure 3 is a vertical sectional view similar to Fig. 2 showing the tire engaging rod moved to its operative position relative to the rim engaging arm with the rod in position to be shifted by the operating screw, and Figure 4 is a fragmentary rear elevational view of the tool, showing a part of the wheel rim with the arm engaging the lower side of the wheel rim or flange with the foot carried by the rod in position for engagement with the upper side of the tire bead.

Referring more in detail to the accompanying drawing, there is illustrated a tool for removing a tire from a vehicle wheel rim including a casing, preferably rectangular in cross-section and open at its lower end as shown in Figs. 2 and 3, the upper wall 2 of the casing having a centrally positioned boss and an axial internally threaded opening 3 through which an operating screw 4 works, the upper end of the screw 4 carrying a crank handle 5.

The rear wall of the casing 1 carries a depending laterally offset arcuate arm 6, the lower end of which is bifurcated and bent to provide a pair of hook members 7 for engagement with a side edge or flange of a wheel rim, the bifurcated end of the arm 6 accommodating the mounting thereof upon a wire spoke wheel as will be obvious.

A tire engaging rod 8 preferably rectangular in cross section, of a width substantially equal to the internal diameter of the casing 1, and of less depth than said casing as shown in Figs. 2 and 3 is freely disposed within the casing and carries an angle extension 9 at the upper end thereof to be engaged by the operating screw 4. The lower end of the rod 8 carries a relatively long transversely positioned arcuate tire engaging foot 10 having a curved lower edge $10^a$ for proper engagement with the adjacent side or bead of the tire T shown in Fig. 1.

In placing the tool in operative position upon a tire and wheel rim, R the rod 8 is loosely mounted or disposed within the casing 1 as shown in Fig. 2, the lower bifurcated end 7 of the arm 6 carried by the casing being positioned for engagement with the lower edge or flange of the wheel rim while the arcuate foot 10 is disposed above the upper side of the tire T. An adjusting screw 11 threaded through the lower end of the front wall of the casing 1 engages the adjacent face of the rod 8 for shifting the same within the casing 1 to move the tire engaging foot 10 and the rim engaging end of the arm 6 into the operative position shown in Fig. 1, at which time the operating screw 4 being turned by the crank handle 5 has the lower end thereof engaging the extension 9 upon the upper end of the rod for lowering the same, thereby exerting a downward pressure upon the upper side of the tire T to remove the same from the wheel rim R shown in Figs. 1 and 4. Considerable difficulty is encountered in removing a tire from a wheel rim when the tire has become rusted thereto, and by shifting the tool to different points on the tire and rim, the tire is quickly and easily removed therefrom.

While there is herein shown and described the preferred embodiment of the present invention, it is nevertheless to be understood that minor changes may be made therein without departing from the spirit and scope thereof as claimed.

What I claim is:—

1. In a tire removing tool, a casing, a rim engaging arm depending from the casing, a rod loosely mounted in the casing, an arcuate foot carried by the outer end of the rod for engagement with a tire, means carried by the casing and engaging the rod for moving the same to operative position relative to the rim engaging arm, an angle extension carried by the inner end of the rod and an operating screw threaded through the upper end of the casing engaging the angle extension for forcing the rod and foot into engagement with a tire.

2. In a tire removing tool, a casing having an open end, an offset arcuate rim engaging arm depending from the open end of said casing, said arm having a bifurcated lower end bent to form a pair of inwardly directed spaced hooks, a rod freely disposed in said casing projecting through said open end, a foot carried by the projecting end of said rod for engagement with a tire, means carried by the casing and engaging the rod for moving the same to operative position relative to the rim engaging arm, an angle extension carried by the inner end of the rod, and an operating screw threaded through the upper end of the casing engaging the angle extension for forcing the rod and foot into engagement with a tire.

3. In a tire removing tool, a casing having an open end, a rim engaging arm depending from the open end of said casing, a rod laterally and longitudinally movably disposed in said casing projecting through said open end, a foot carried by the projecting end of said rod for engagement with a tire, means carried by the casing and engaging the rod for laterally moving the same to operative position relative to the rim engaging arm, and means carried by the closed end of the casing engaging the inner end of the rod for moving the latter longitudinally to force its foot portion into engagement with a tire.

In testimony whereof I affix my signature.

CLINT B. SNIDER.